United States Patent [19]
Bell

[11] Patent Number: 6,070,207
[45] Date of Patent: May 30, 2000

[54] HOT PLUG CONNECTED I/O BUS FOR COMPUTER SYSTEM

[75] Inventor: D. Michael Bell, Beaverton, Oreg.

[73] Assignee: Intel Corporation, Santa Clara, Calif.

[21] Appl. No.: 09/137,164

[22] Filed: Aug. 20, 1998

Related U.S. Application Data

[63] Continuation-in-part of application No. 09/013,518, Jan. 26, 1998.

[51] Int. Cl.[7] .............................. G06F 13/00; G06F 1/24
[52] U.S. Cl. ........................... 710/103; 710/129; 370/402
[58] Field of Search ................................... 710/101–103, 710/128, 129, 131; 712/33; 713/100; 714/7; 370/402, 911; 361/683, 686

[56] References Cited

U.S. PATENT DOCUMENTS

| | | | |
|---|---|---|---|
| 5,777,996 | 7/1998 | Chan et al. | 370/402 |
| 5,784,576 | 7/1998 | Guthrie et al. | 710/103 |
| 5,875,307 | 2/1999 | Ma et al. | 710/101 |
| 5,875,308 | 2/1999 | Egan et al. | 710/103 |
| 5,930,496 | 7/1999 | MacLaren et al. | 395/500.44 |

OTHER PUBLICATIONS

"Hot Plug PCI Eliminates Costly Downtime," Innovate Forum '97, vol. II, Apr. 8–10, 1997 (2 pages).
"Deploying PCI Hot Plug on Compaq Servers in a Microsoft Windows NT Environment," 1st Ed., Jul., 1997 (2 pages).
"Compaq's Hot Plug PCI Enables On–Line I/O Replacement Improving Enterprise Server Availability," Jun. 24, 1996 (5 pages).
"Compaq Ships Hot Plug PCI Development Platforms; Submits Draft PCI Hot Plug Specification," Dec. 4, 1996 (2 pages).
"PCI Hot Plug Specification," Oct. 6, 1997, Rev. 1.0 (38 pages).

*Primary Examiner*—Gopal C. Ray
*Attorney, Agent, or Firm*—Antonelli, Terry, Stout & Kraus, LLP

[57] ABSTRACT

A computer system includes a host processor coupled to a host bus. The computer system also includes a memory system coupled to the host bus, and an I/O bridge controller coupled to the host bus and including a plurality of ports. An I/O bus bridge is provided that is hot plug connectable to at least one of the bridge controller ports via one or more first buses. There are one or more second buses coupled to the I/O bus bridge.

20 Claims, 4 Drawing Sheets

FIG. 2

HOT PLUG CONNECTED I/O BUS FOR COMPUTER SYSTEM

CROSS-REFERENCE TO RELATED APPLICATIONS

This application is a continuation-in-part of application Ser. No. 09/013,518 filed on Jan. 26, 1998 and entitled "Scalable Computer System," hereby incorporated by reference.

BACKGROUND OF THE INVENTION

The invention generally relates to computer systems and in particular to an I/O bus that can be plugged into or unplugged from a computer system without powering down the computer system.

As a particular computer's usage and applications expand, it may be desirable to expand the I/O capabilities of that computer. However, most computer systems are not designed to be significantly upgraded due to inherent architectural limitations. Rather, most current computer systems are fixed capacity systems and cannot be easily expanded or upgraded. A computer system typically includes a memory controller and an I/O controller. For current systems, the memory controller typically interfaces a fixed amount of memory to the host bus, and the I/O controller typically interfaces a fixed number of I/O buses to the host bus. For example, A PCI-to-host bridge may interface a Peripheral Component Interconnect (PCI) bus to the host bus. Typically one bridge is required for each PCI bus. A PCI bus is a high performance, high bandwidth bus configured in accordance with protocols established by the PCI Special Interest Group. The PCI-to-host bridge is provided, in part, to facilitate conversion of data from the PCI format to a format employed by the host bus. The only technique available to increase memory and I/O capabilities is to add additional controllers or components to the host bus. However, many state of the art host buses are highly sensitive to the number of components, such as bridges, connected to the host bus. With such buses the maximum permissible clock rate is often inversely proportional to the number of components connected to the host bus due to the electrical load supplied by each component. Accordingly, the connection of additional bridges or component directly to the host bus results in a lowering of the maximum permissible clock rate, thereby lowering the overall performance of the system. As a result, the connection of an additional PCI bridge may lower the maximum permissible bus rate to a level which significantly hinders the performance of the overall computer system. Thus, a user is typically forced to purchase a new computer system to obtain significant additional I/O and memory capabilities. Therefore, there is a need for a computer system that is more flexible and which can be expanded more easily to meet the growing I/O needs without significantly degrading system performance.

In addition, many existing computer systems include input/output (I/O) devices, such as PCI compatible devices or PCI expansion cards which can be connected to one of several PCI expansion slots. In computer systems utilizing a PCI bus, PCI expansion cards can be unplugged from and plugged into PCI expansion slots while the computer system is powered and running (so-called "hot plug"). The ability to hot plug PCI cards and adapters is desirable because PCI expansion cards can be replaced without having to power down the computer system. Maintenance can be performed on a server in a network without powering down the computer system thereby allowing use of the computer system during the maintenance period.

However, hot plug PCI has limitations and disadvantages. Hot plug PCI requires that each PCI expansion slot be electrically isolated from the other expansion slots on the PCI bus to prevent interruption to other components and applications using those components during hot plug replacement. This requires significant protective hardware and software to provide the isolation between each of the PCI expansion slots.

Moreover, hot plug PCI only allows for slot-level replacement of individual PCI cards or adapters. Hot plug PCI does not allow for hot plug replacement of an entire I/O bus. As a result, the computer system or server must be taken off-line, powered down, and the cover must be removed to access and replace a defective PCI bus.

Also, as described above, I/O capabilities cannot be upgraded in current computers because the number and type of I/O buses is usually fixed. I/O capabilities of current computers cannot be significantly upgraded, much less upgraded without having to power down the computer. Therefore, in order to upgrade or improve I/O capabilities requires a computer system to be powered down and then replaced with a computer having improved I/O features (e.g., additional I/O buses). This typically results in significant computer down time and increased expense due to the cost of the replacement computer system. Therefore, a need exists for a computer system that allows complete I/O buses to be replaced or added to the computer system without powering down the computer system.

SUMMARY OF THE INVENTION

According to an embodiment of the present invention, a computer system includes a host processor coupled to a host bus. The computer system also includes a memory system coupled to the host bus, and an I/O bridge controller coupled to the host bus that includes a plurality of ports. An I/O bus bridge is provided that is hot plug connectable to at least one of the bridge controller ports via one or more first buses. There are one or more second buses coupled to the I/O bus bridge.

According to another embodiment of the present invention, a method of unplugging a bus system from a computer system while power is applied to the computer system includes the steps of notifying the computer system which bus system will be unplugged, placing the bus system in a non-operational mode and re-mapping memory mapped I/O address space to account for removal of the bus system from the computer system. The method also includes the steps of providing an indication that the bus system may be unplugged from the computer system and unplugging the bus system while power is applied to the computer system.

According to yet another embodiment of the present invention, a method of plugging in a bus system to a computer system while power is applied to the computer system is provided. The bus system includes a bus bridge and one or more I/O buses. The method includes the steps of plugging in a bus system into the computer system while power is applied to the computer system, applying power to the bus system and placing the bus system in an operational mode. The method also includes the steps of confirming a communications connection between the computer system and the bus system. If the communications connection between the computer system and the bus system was successfully confirmed, then the method performs the steps of identifying the specific type of the bus bridge, identifying a mode of operation of one or more of the I/O buses and configuring at least a portion of the bus system.

DETAILED DESCRIPTION

Figure 1:
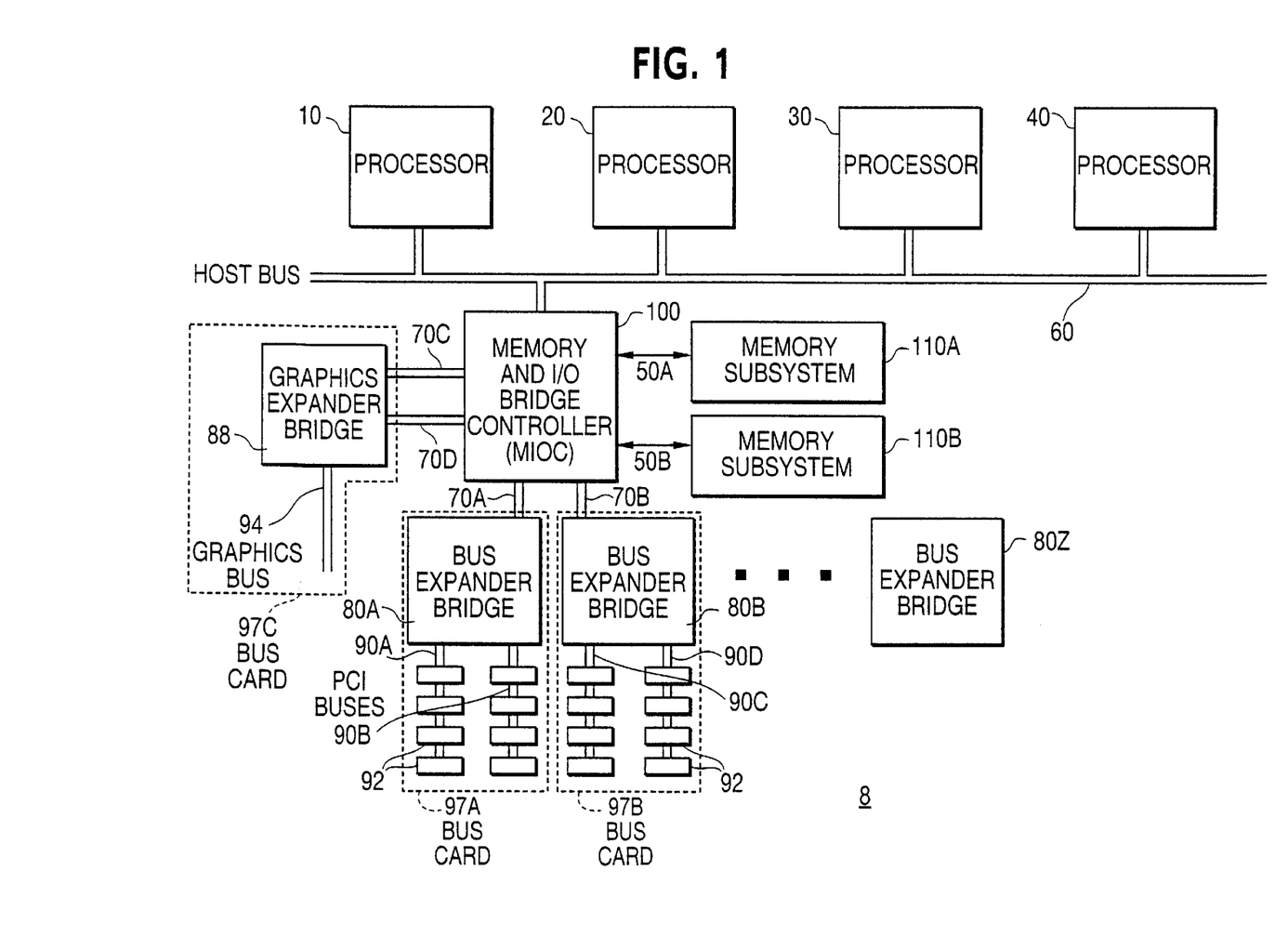
FIG. 1 is a block diagram illustrating a computer system according to an embodiment of the present invention.

Referring to the figures in which like numerals indicate like elements, FIG. 1 is a block diagram illustrating a computer system according to an embodiment of the present invention. Computer system 8 includes one or more processors, such as processors 10, 20, 30 and/or 40. The processors are connected to a host bus 60 of computer system 8. A plurality of memory subsystems 110, including subsystems 110A and 110B are connected to host bus 60. Memory subsystems 110A and 110B are connected to host bus 60 via lines 50A and 50B, respectively. Memory subsystem 110A and 110B each include a memory array, such as dynamic random access memory (DRAM) array and associated control logic. Computer system 8 also includes a memory and input/output (I/O) bridge controller (MIOC) 100 connected to host bus 60 for interfacing one or more external buses (e.g., PCI buses) and memory subsystems 110 to host bus 60. Although MIOC 100 is shown as a single block or component in FIG. 1, the MIOC 100 can alternatively be provided as a separate memory controller and a separate I/O bridge controller.

Computer system 8 also includes a plurality of bus expander bridges 80 (including bus expander bridges 80A, 80B, . . . 80Z). Bus expander bridges 80A and 80B are connected to MIOC 100 via expander buses 70A and 70B, respectively. MIOC 100 includes a plurality of expander bus ports. Each expander bus port accommodates or can be connected to an expander bus 70. Each bus expander bridge 80 interfaces one or more external buses (such as PCI buses 90A, 90B, 90C and 90D) to MIOC 100 via an expander bus 70. Computer system 8 also includes a graphics expander bridge 88 connected to MIOC 100 via expander buses 70C and 70D. Graphics expander bridge 88 interfaces a graphics bus 94 to MIOC 100 via expander buses 70C and 70D. One or more graphics devices (e.g., graphics cards) can be attached to graphics bus 94. Graphics bus 94 can be, for example, an Accelerated Graphics Port (AGP) bus.

Although only one graphics expander bridge 88 is shown in FIG. 1, there may be several graphics expander bridges 88 or other devices each connected to MIOC 100 via one or more expander buses 70. Likewise, while FIG. 1 shows only four expander buses (70A, 70B, 70C and 70D) connected to MIOC 100, MIOC 100 may be connected to many additional expander buses 70 to allow the I/O capabilities of computer system 8 to be easily expanded.

Referring to FIG. 1, according to an embodiment of the present invention, processors 10, 20, 30 and 40 and MIOC 100 are provided or mounted on a motherboard (not shown). A bus system, including bus expander bridge 80A, PCI buses 90A and 90B and the associated PCI expansion slots 92 is provided on a bus card 97A. Bus card 97A and the motherboard include the appropriate electrical connectors so that bus card 97A can be plugged into the motherboard. Similarly, a bus system including bridge 80B, PCI buses 90C and 90D and associated PCI expansion slots 92 is provided on bus card 97B and may be plugged into the motherboard. Another bus system provided on bus card 97C includes graphics expander bridge 88 and graphics bus 94 and may also be connected to the motherboard. Memory subsystems 110A and 110B are also provided on either one memory card or multiple memory cards for connection to the motherboard. As described in greater detail below, bus cards 97 and memory cards may be plugged into and unplugged from the motherboard while the computer system is running (while power is applied to computer system 8). In other words, bus cards 97 and the memory cards are hot pluggable. This permits entire I/O buses and memory systems to be added or replaced without powering down the computer system 8.

According to an embodiment of the present invention, expander buses 70A, 70B, 70C, 70D, etc. are each a fast 16-bit wide bidirectional data bus that carries commands, addresses, data and transaction ID information. In addition, each expander bus 70 includes two additional control bits.

Each bus expander bridge 80 includes multiple PCI ports wherein each PCI port is provided for connecting and interfacing to a PCI bus. In the embodiment illustrated in FIG. 1, bus expander bridge 80A includes two PCI ports for accommodating two PCI buses 90A and 90B. Similarly, bus expander bridge 80B includes two PCI ports for accommodating two PCI buses 90C and 90D. Although only two PCI buses 90 are connected to each bridge 80 in FIG. 1, each bridge 80 can include additional PCI buses 90 to allow the I/O capabilities of computer system 8 to be expanded. A plurality of PCI expansion slots 92 are connected to each PCI bus 90 to allow one or more PCI devices to be plugged in or connected to each PCI bus 90. A wide variety of PCI devices or adapters may be plugged in to PCI expansion slots 92, such as a PCI-compatible magnetic hard-disk drive.

According to the present invention, one or more bus expander bridges 80 can be coupled to host bus 60 via MIOC 100. However, MIOC 100 applies only a single electrical load to host bus 60. Therefore, the MIOC 100 along with bus expander bridges 80 and graphics expander bridges 88 of the present invention allow for multiple external buses (e.g., PCI buses, graphics buses) to be connected to host bus 60 without degrading host bus performance because the multiple external buses appear as a single electrical load on host bus 60.

Although bus expander bridges 80A and 80B each provide an interface to PCI buses 90, the expander bridges 80A and 80B of the present invention could alternatively interface to other types of external buses. Therefore, the bus expander bridge 80 of the present invention is therefore not limited to interfacing to PCI buses.

According to an embodiment of the present invention, each bus expander bridge 80 provides two independent 32-bit, 33 MHZ, Rev. 2.1 compliant PCI interfaces. Each PCI interface requires 50 signals for the bus, plus 12 additional arbitration and support signals according to the PCI standard. Each bus expander bridge 80 provides the primary control and data interface between the PCI buses 90A and 90B and the expander buses 70A and 70B. Each bus expander bridge 80 includes PCI ports for accommodating multiple PCI buses as illustrated in FIG. 1.

In addition, each bus expander bridge 80 can also be configured to combine multiple PCI buses to provide a single PCI bus having increased bandwidth. According to an embodiment of the present invention, each bus expander bridge 80 can be configured to provide two independent 32-bit PCI buses (independent 32-bit mode) or alternatively to combine the two 32-bit PCI buses (buses 90A and 90B for bridge 80A, or 90C and 90D for bridge 80B) to obtain a single 64-bit PCI bus (combined 64-bit mode). Therefore, the bus expander bridge 80 of the present invention provides improved flexibility because each bus expander bridge 80 can be configured to accommodate different sized buses.

Each bus expander bridge 80 can be configured in either the independent 32-bit mode or the combined 64-bit mode using a variety of techniques. For example, the bridge 80 can be configured by setting the state of a 64-bit mode pin input to bridge 80 using a jumper, by programming one or more silicon fuses in bridge 80, or by processor 10 initializing bridge 80.

MIOC 100 performs several functions. First, MIOC 100 provides an interface to the host bus 60. MIOC 100 monitors processor initiated transactions, interpreting addresses and directing claimed addresses to the memory subsystems 110 (host-DRAM transactions) or to PCI buses 90 (host-PCI transactions). Second, MIOC 100 also accepts transactions forwarded from the PCI buses 90, through bus expander bridges 80 (or from graphics bus 94 through graphics expander bridge 88) and across expander buses 70. Accesses directed to the memory subsystem 110 (PCI-DRAM transactions) have zero-length equivalents placed on the host bus 60 to snoop the processor caches, while the data transfer is handled directly between the MIOC and the memory subsystem 110. Third, the MIOC 100 operates as a memory controller for memory subsystem 110, issuing commands to the control circuits on subsystem 110 and accepting data returned from the DRAMs of memory subsystem 110. Finally, the MIOC 100 provides data buffer storage for the data received from the memory array of memory subsystem 110, the host bus 60 and the PCI buses 90.

The computer system 8 of the present invention provides a scalable architecture that allows CPU, memory and I/O capabilities to be expanded using the same set of basic components. First, computer system 8 can be provided with one processor, or multiple processors. Second, MIOC 100 can accommodate a variable number (e.g., either one or two memory cards or memory subsystems (110A, 110B, etc.) via interface lines 50A or 50B. This allows memory capabilities of computer system 8 to be expanded.

In addition, the I/O capabilities of computer system 8 can be expanded at several different levels. The MIOC 100 includes several expander buses 70 that are available for adding one or more additional bus expander bridges 80, graphics expander bridges 88 or other devices. In addition, MIOC 100 can be configured to operate each expander bus 70 either independently (e.g., independent 16-bit mode), or to combine two or more expander buses 70 to create a single expander bus having greater bandwidth (e.g., combined 32-bit mode). For example, the MIOC 100 illustrated in FIG. 1 has been configured to operate the 16-bit expander buses 70A and 70B independently, and to combine expander buses 70C and 70D to create a single 32-bit wide expander bus that better accommodates the high bandwidth requirements from graphics bus 94. The MIOC 100 can be configured to select either the combined or independent mode for each expander bus 70 using a variety of techniques. For example, MIOC 100 can be configured by setting the state of one or more pins using jumpers, by programming one or more silicon fuses in MIOC 100, or by processor 10 initializing MIOC 100. In addition, each PCI bus 90 connected to bus expander bridge 80 can be configured in either an independent mode in which each 32-bit PCI bus 90 operates independently, or a combined 64-bit mode in which two 32-bit PCI buses 90 are combined to provide a single 64-bit PCI bus.

Therefore, computer system 8 provides a great deal of flexibility in allowing memory and I/O capabilities to be scaled to meet user needs. Moreover, system cost and size advantageously scale with capability. As a result, a single computer system 8 can be initially assembled that includes a host processor 10, a host bus 60, MIOC 100, and, for example one memory subsystem 110A and one bus expander bridge 80A.

Initially, the MIOC 100 includes many ports for expander buses 70 that are available but unused. The bus expander bridge 80A can be configured to meet the initial needs of the user (e.g., two 32-bit PCI buses or a single 64-bit PCI bus). Additional memory subsystems 110, bus expander bridges 80 and graphics expander bridges 88 can be connected to unused expander bus ports of MIOC 100 and configured as needed to meet new memory and I/O requirements for the system.

According to an embodiment of the present invention, I/O expansion or replacement in computer system 8 can be facilitated through an auto-detection feature. The auto-detection feature allows MIOC 100 to automatically detect the proper communications connection between MIOC 100 and each bus expander bridge 80, graphics expander bridge 88 or other device connected to MIOC 100. Before attempting any configuration access to a bus expander bridge 80 or a graphics expander bridge 88, or configuring the memory-mapped and I/O ranges in either MIOC 100 or bridges 80 or 88, the bus expander ports of MIOC 100 must be tested to determine if there is a proper communications connection between MIOC 100 and each bus expander bridge 80 or graphics expander bridge 88. According to an embodiment of the present invention, this can be accomplished using a check connection register (CHKCON register) and a check connection protocol, described below. Other techniques can be used to confirm the communications connection between MIOC 100 and each bridge.

The check connection protocol can be performed for all bus expander ports of MIOC 100. The CHKCON register is located in the MIOC 100 and includes a test port flag and a live port flag for each bus expander port of MIOC 100. For example, test port A flag and live port A flag are associated with the port for expander bus 70A, and test port B flag and live port B flag are associated with the port for expander bus 70B. A processor write operation setting a test port flag triggers the check connection protocol for that port. After the check connection protocol has been performed, the live port flag indicates whether or not there is a bridge or other device connected to the port. If the live port flag is cleared (after the check connection protocol), this indicates that there is no device connected to the corresponding port (or failure of the check connection protocol). While if the live port flag is set, this indicates the presence of a bridge or other device connected to the port and success of the check connection protocol. Therefore, success or failure of the check connection protocol results in setting or clearing, respectively of the corresponding live port flag.

According to one embodiment of the check connection protocol, after reset, processor 10 can set one or more selected test port flags for each port to be tested. For example, processor 10 can set the test port flags for all bus expander ports. Processor 10 then periodically checks the status of each corresponding live port flag. After a predetermined period of time has elapsed without a live port flag being set, the processor 10 assumes there is no device connected to the port. This illustrates only one possible convention for initiating and performing a check connection protocol. For example, an alternative check connection protocol can be used wherein the success or failure of the check connection protocol results in the clearing or setting, respectively, of the corresponding live port flag. Those skilled in the art will appreciate that other variations or different types of protocols than those described herein can be similarly used to initiate and test the communications connections.

Figure 2:
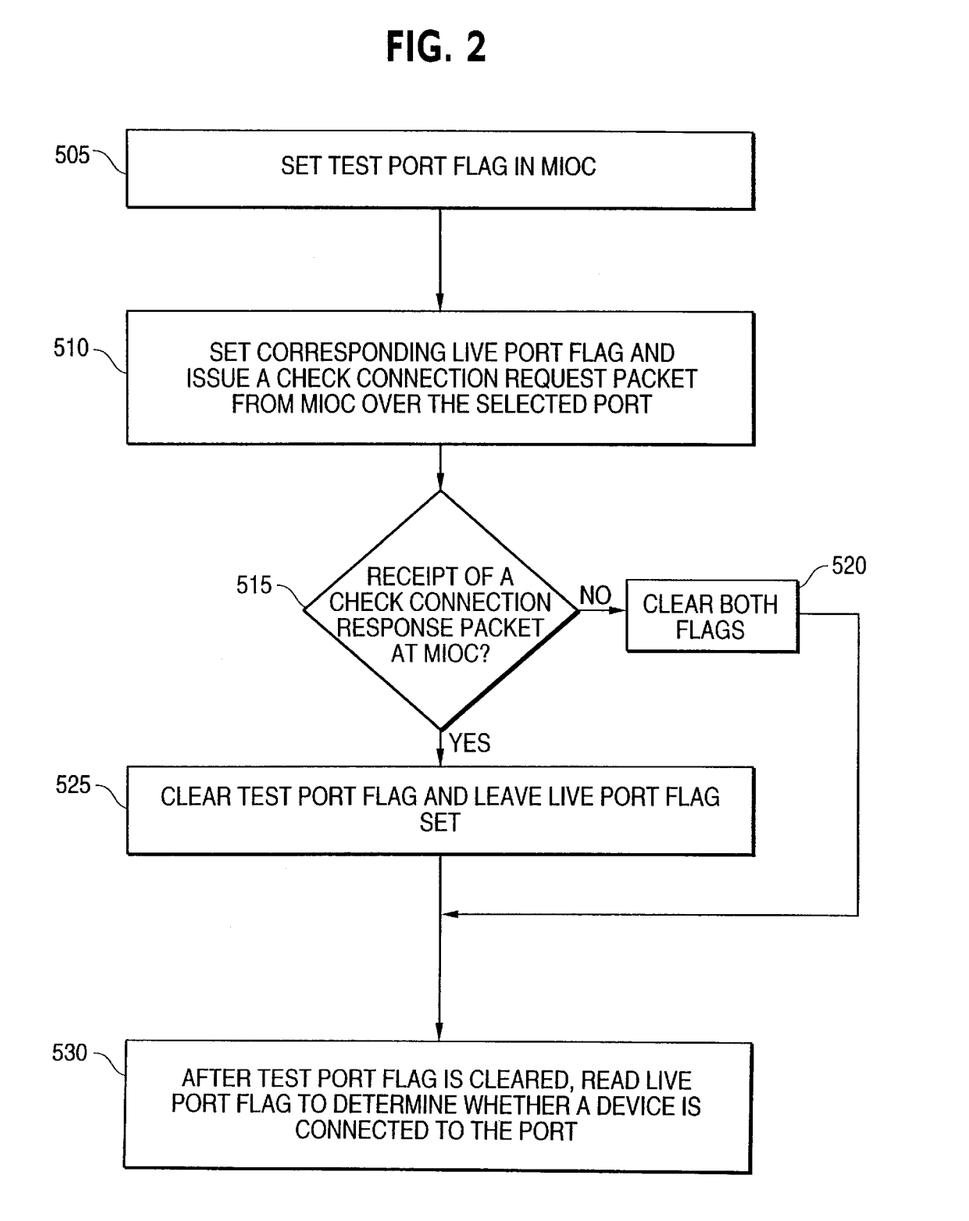
FIG. 2 is a flow chart illustrating a check connection protocol according to an embodiment of the present invention.

FIG. 2 is a flow chart illustrating a check connection protocol according to an embodiment of the present invention. At step 505, the processor 10, operating under Basic Input/Output System (BIOS) software control after system reset, sets a test port flag in the CHKCON register in MIOC 100 for the bus expander port (or ports) to be tested.

At step 510, in response to the processor 10 setting the test port flag, MIOC 100 sets the corresponding live port flag in the CHKCON register in MIOC 100 and issues a check connection request packet over the selected bus expander port.

If a device (such as a bus expander bridge 80) is connected to the bus expander port being tested, the device (e.g., bridge 80) outputs a check connection response packet (including predetermined data) to MIOC 100 in response to the check connection request packet. At step 515, the MIOC 100 determines whether it has received a check connection response packet containing predetermined data (indicating a proper response from a bridge or device).

At step 525, if the MIOC 100 detects a check connection response packet containing the predetermined data from the connected device, the MIOC 100 then clears the test port flag (indicating that the test is completed and that the processor 10 can now read the live port flag) and leaves the live port flag set (indicating a successful check connection test).

At step 520, if after some predetermined period of time, no check connection response packet arrives at MIOC 100 over the selected port (or the response packet arrives with incorrect data), then the MIOC 100 clears the live port flag (indicating that there was no bridge or device connected to the selected bus expander port) and then clears the test port flag (indicating that the test is over and the processor 10 can read the live port flag). At step 530, the processor periodically reads the test port flag. After the test port flag is cleared (indicating that the test of the port is completed), the processor 10 then reads the live port flag. If the live port flag is set, this indicates that there is a bridge or device connected to the selected port and that the device passed the check connection protocol (e.g., a proper communication connection was established between the connected device and the MIOC 100). If the live port flag is cleared, this indicates that no device is connected to the selected port, or that any device connected to the port failed the check connection protocol (e.g., proper communications was not established between the device and the MIOC 100).

According to another embodiment of the check connection protocol, the port for expander bus 70A is always connected to a bus expander bridge 80A. After reset, the port for expander bus 70A always comes up active, while other ports come up disabled and must be tested through the check connection protocol. According to this embodiment, this is required because the check connection protocol is performed by BIOS software which is fetched across the live port for bus 70A. If the port for bus 70A is not live after reset, the computer system 8 cannot access the BIOS software and the system itself will not boot.

After the processor 10 determines which expander bus ports are connected to a device, the processor then reads each device's configuration (CONFIG) register to determine what type of device is attached to the port (e.g., a bus expander bridge 80 or a graphics expander bridge 88). For example, processor 10 (under BIOS control) can read an ID Code in a bridge's CONFIG register to determine that bridge 80A is a bus expander bridge 80. Processor 10 also reads each device's CONFIG register to determine whether the expander buses 70 are configured in an independent mode or a combined mode (e.g., combining two expander buses 70 to create a single 32-bit bus). (Alternatively, this information describing the mode of expander buses 70 may be read from a CONFIG register in MIOC 100). Because the PCI buses 90 connected to bus expander bridges 80 can be connected in either an independent mode or a combined mode, processor 10 also reads a mode flag in each bridge's CONFIG register to determine whether the PCI buses 90 have been configured in the independent mode or the combined mode. Likewise, for graphics expander bridge 88, processor 10 (under BIOS control) reads the ID code in the bridge's CONFIG register to determine that the bridge is a graphics expander bridge 88. However, the graphics expander bridge 88 has only one mode (AGP bus mode), which is known to the BIOS. The CONFIG register in each bridge can be initially set through one or more jumpers or using other techniques.

In a similar fashion, processor 10 can check the memory ports connected to memory subsystems 110 to determine how many memory cards or memory subsystems 110 are connected over lines 50A and 50B, and the amount of memory in each memory subsystem. The auto-detection feature allows additional components and buses to be added and configured as needed.

After detecting the presence of each device connected to MIOC 100 (e.g., using the check connection protocol) and determining the identity and configuration of each device, processor 10 (under BIOS control) then configures each device by mapping the available memory mapped I/O address space among all the devices, and by initializing several parameters in each device. Similarly, the processor 10 then configures the MIOC 100 based on the memory mapping of I/O address space. According to one embodiment of the present invention, processor 10 configures MIOC 100 by writing address mapping information to a DEVMAP (device map) register in MIOC 100 to indicate which I/O address range corresponds to each port of MIOC 100. The DEVMAP register contains a memory map matching each port to an address range. It is important for processor 10 to determine the mode (independent or combined) for the buses 70 and 90 of each bridge because separate address ranges should be provided for independent buses. However, shared (or combined) buses can share the same I/O address range. For example, a 1 Meg available I/O address range may be divided equally among four bridges 80, with each bridge having a 250 K address range. For example, at a first bridge, the 250 K address range is divided to provide 125 K to each of the two 32-bit PCI buses (independent mode) connected to the first bridge. Likewise, for two PCI buses in the combined mode, the entire 250 K address range for the bridge 80 can be allocated to the combined PCI buses, as an example. Thus, the MIOC 100 uses the memory map (e.g., stored in the DEVMAP register) to identify the destination (the port number) for a packet or transaction received from processor 10. The MIOC 100 then sends the received packet to the bus expander port identified by the memory map that corresponds to the packet address.

Rather than using jumpers or silicon fuses to permanently or semi-permanently select the configuration of various devices, one or more devices can be reconfigured as the system is expanded to meet new I/O and memory requirements. The ROM BIOS software can be changed to automatically write or change the configuration register to reconfigure each device if necessary.

In addition, MIOC 100 includes bus drivers for each port. According to an embodiment of the present invention, after processor 10 determines which ports are connected to a bridge or other device, processor 10 can issue a command (or otherwise controls MIOC 100) to cause MIOC 100 to disable the bus drivers for each bus expander port that is not connected to a device (e.g., each port that did not pass the check connection protocol). If the bus drivers are CMOS drivers, these drivers can be disabled by tristating their outputs. If the bus drivers are open drain, then the bus drivers can be floated.

One or more of the bus expander bridges 80 and graphics expander bridges 88 (including the connected external buses and devices) can be disconnected from MIOC 100 or connected to MIOC 100 without powering down computer system 8. As a result, it is possible to replace or add a bus expander bridge 80, graphics expander bridge 88, etc., without taking computer system 8 offline or without turning power off. As a result, the bridges of the present invention are "hot plug" connected or hot pluggable to computer system 8. While computer systems currently offer PCI hot plug systems in which a PCI device or expansion card can be added to or removed from a PCI bus while the system is running, there is presently no facility available for replacing or adding one or more I/O buses while the system is running.

The procedure for replacing a bus expander bridge 80 (which may be, for example, in the form of a bus expander bridge card) according to an embodiment of the present invention will now be briefly described. As an example, the bus expander bridge card that will be replaced includes a bus expander bridge 80 and multiple PCI buses 90. Each bus 90 includes a plurality of PCI expansion slots 92 in which a PCI expansion card or device can be plugged in.

According to an embodiment of the present invention, the procedure for replacing a bus system (e.g., a bus card 97, including a bus expander bridge 80, one or more PCI buses 90 and associated PCI expansion slots 92) will now be described with reference to FIGS. 3 and 4. For example, as described above, the bus system may be provided on a bus card 97A, or the like.

Figure 3:
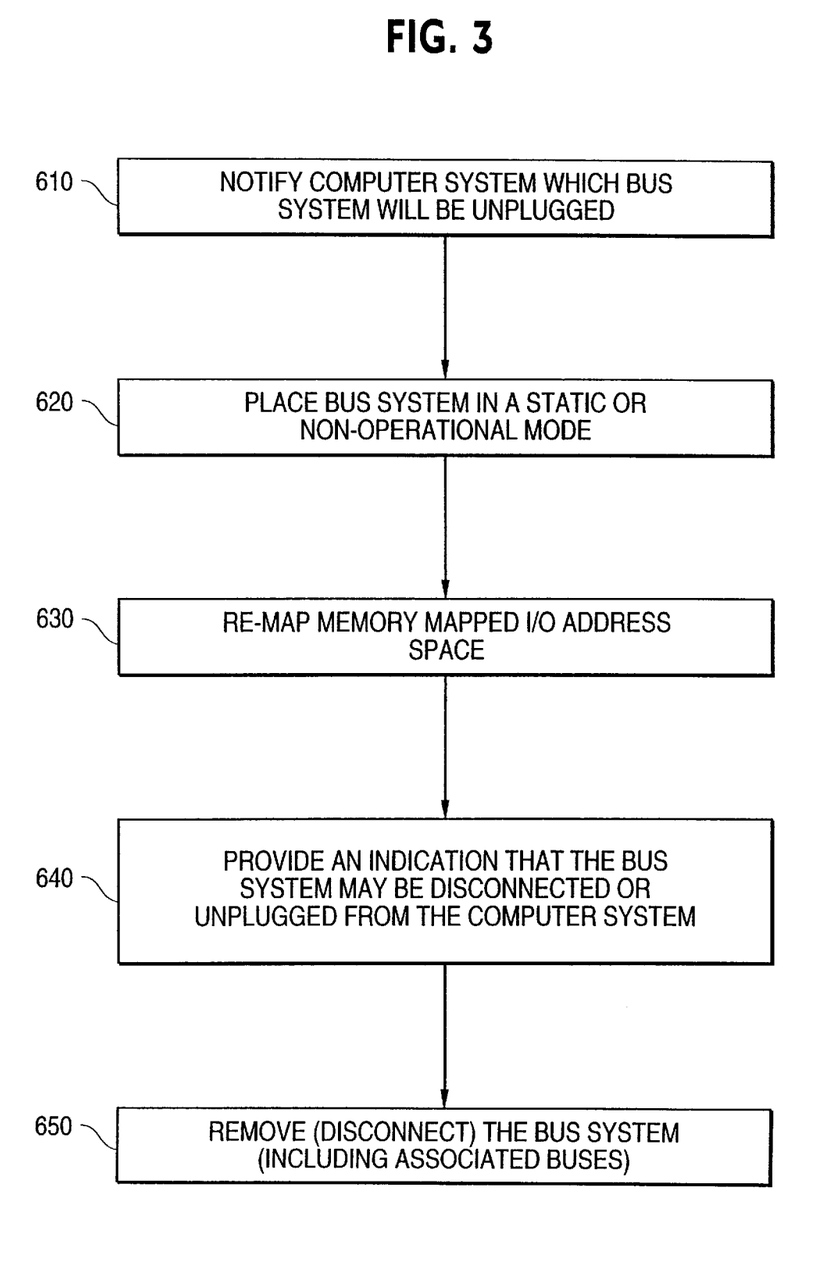
FIG. 3 is a flow chart illustrating a procedure for disconnecting or unplugging a bus system from computer system while power is applied to the computer system according to an embodiment of the present invention.

FIG. 3 is a flow chart illustrating a procedure for disconnecting or unplugging a bus system from computer system 8 while the computer system is running (i.e., while power is applied) according to an embodiment of the present invention. FIG. 4 is a flow chart illustrating a procedure for connecting or plugging in a bus system into a computer system 8 while the computer system is running according to an embodiment of the present invention. The steps of FIG. 3 may be performed to remove or unplug a bus system. The steps of FIG. 4 may be performed to add or plug in an additional bus system to the computer system. In addition, according to an embodiment of the present invention, the steps of FIGS. 3 and 4 can be performed to first remove (FIG. 3) and then replace (FIG. 4) a defective bus system in computer system 8 without powering down the system.

Referring to FIG. 3, at step 610, the user first notifies computer system 8 that a particular bus system (e.g., bus card 97, including a bus expander bridge 80, one or more PCI buses 90 and PCI expansion slots 92) will be unplugged or disconnected from computer system 8. The user can notify the computer system 8 by using a keyboard or console to identify the bus system, or by pressing a predetermined button on computer system 8 (e.g., a button on the particular bus card 97 to be removed). A green LED, for example, on the outside of the computer system 8 is lit to indicate that the bus system is operational or active (and cannot yet be disconnected or unplugged).

At step 620 of FIG. 3, in response to the notification from the user, the computer system 8 places the bus system (e.g., bus card 97) in a static or non-operational state. According to an embodiment of the present invention, step 620 can be performed by quiescing bus card 97. Quiescing can include electrically quiescing bus card 97 and/or operationally quiescing of bus card 97. According to an embodiment of the present invention, bus card 97 is quiesced both electrically and from an operational standpoint (e.g., software).

To operationally quiesce the bus system that will be disconnected, the bus expander bridge 80 (or graphics expander bridge 88 or other bridge) on bus card 97 should be reset by host processor 10 issuing a reset command to bridge 80. In the reset or static state (operationally quiesced state), the bus expander bridge 80 will not issue or send any packets or transactions to MIOC 100 (including transactions or packets directed to host processor 10), and the host processor 10 and MIOC 100 will not send any transactions to the bus card 97.

Next, the bus card 97 is electrically quiesced by disabling the bus drivers or bus transceivers on the MIOC 100 and the bus expander bridge 80 which interface to bus 70. Bus drivers or transceivers can be disabled by tri-stating their outputs (e.g., for CMOS drivers) or by leaving the transceivers in the undriven state (e.g., for open drain drivers). When the bus system (e.g., bus card 97) has been quiesced (both electrically and operationally), the bus system (bus card 97) can be safely removed or unplugged from the computer system.

Unlike current PCI hot plug, it is unnecessary to electrically isolate each PCI expansion slot in the system of the present invention. Since the connection between MIOC 100 and bus card 97 is a point-to-point link (via bus 70), if bus card 97 has been quiesced (electrically and operationally) and the MIOC transceivers which interface to bus 70 have been disabled, then both the MIOC 100 and the bus card 97 will cease all bus activity over bus 70 and the bus card 97 may be safely disconnected unplugged from the computer system. On the other hand, in PCI, only one PCI expansion slot is quiesced (to allow one PCI device to be removed from the PCI bus), while the PCI bus itself and other PCI expansion slots continue normal operation. Thus, in PCI, it is necessary to electrically isolate the PCI expansion slot to allow the one PCI device to be disconnected without disturbing the PCI bus or the other PCI devices connected to the PCI bus. PCI includes bus and power switches for each expansion slot to isolate and power down an individual slot. The system of the present invention does not need to individually isolate each expansion slot (e.g., slots 92) because the entire bus system (e.g., bus card 97, including bus expander bridge 80, PCI buses 90 and PCI expansion slots 92) is quiesced and disconnected as a unit from the computer system.

In step 630, processor 10 then re-maps the memory mapped I/O address space to indicate that the ports connected to the bus expander bridge 80 are no longer associated with an I/O address range of system 8. This can be performed, for example, by reconfiguring the DEVMAP register in MIOC 100. By re-mapping the I/O address space to remove the bus expander bridge 80 and the associated external (PCI) buses from the map, MIOC 100 will no longer forward any packets or transactions to the ports connected to the bridge 80 that will be removed. The address space can be re-mapped by leaving an address gap, or by reallocating the entire I/O address space across the remaining bridges. Re-mapping the I/O address space is not always necessary. For instance, if one bus system is simply being replaced with another identical (or similar) bus system, it is typically unnecessary to map out the bus system that is being replaced. In fact, if the bus system being replaced is mapped out of the address space when removed, the new bus system would then have to be re-mapped into the address space after being plugged in to computer system 8 (see FIG. 4), causing unnecessary delay and overhead.

In step 640 of FIG. 3, when the I/O address space has been re-mapped, the computer system 8 provides an indication to the user that the bus system can be unplugged or disconnected from system 8. For example, a red LED can be lit to indicate that the bus system is inoperative (quiesced) and can now be removed.

In step 650, the bus system is then unplugged or disconnected from computer system 8. For example, a bus card 97 that includes the bus system thereon can be unplugged from the system's motherboard. As described above, the bus system (including one or more I/O buses) can be unplugged or disconnected from computer system 8 while the computer system is running. This allows users to continue to access and use computer system 8 during maintenance and replacement of one or more bus systems.

Figure 4:
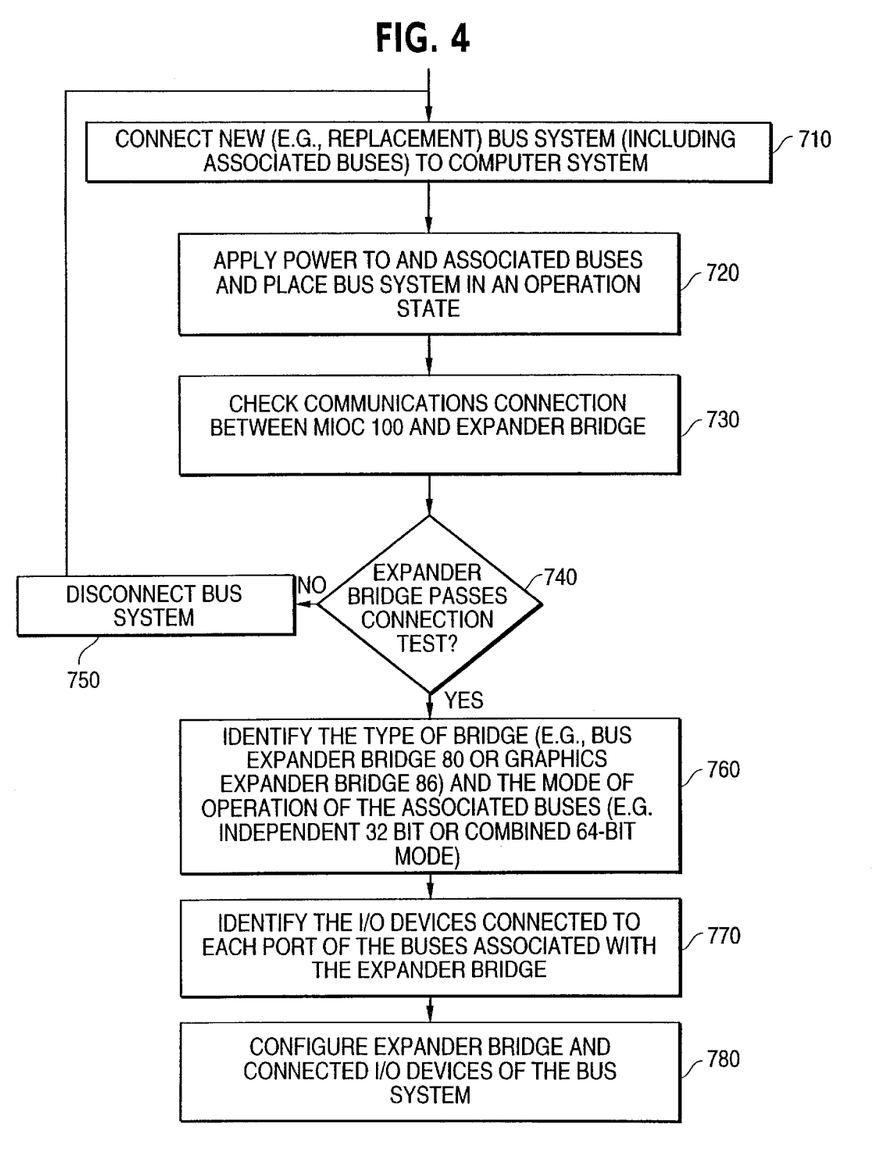
FIG. 4 is a flow chart illustrating a procedure for connecting or plugging in a bus system into a computer system while power is applied to the computer system according to an embodiment of the present invention.

FIG. 4 is a flow chart illustrating a procedure for connecting or plugging in a bus system into a computer system 8 while the computer system is running according to an embodiment of the present invention. In step 710, a new bus system (e.g., a replacement bus system) is plugged into (or connected to) computer system 8. This can be performed, for example, by plugging in a bus card 97 into a motherboard of computer system 8. The bus card 97 may include thereon, for example, a bus expander bridge 80, one or more PCI buses 90 and PCI expansion slots 92. In addition, a user will typically provide an indication to computer system 8 that this new card has been plugged in (e.g., by using the keyboard or by actuating a switch associated with this card).

In step 720 of FIG. 4, computer system 8 applies power to (turns on) the new bus system and places the bus system in an operational mode. Placing the bus system in an operational mode can include for example, enabling the bus drivers in the MIOC 100 and the bus expander bridge 80 (or in the graphics expander bridge 88) and ensuring that bus activity for the new bus system is not quiesced. The bus expander bridge 80 should not be in a reset mode when it is operational, and host processor can confirm this by deasserting a reset bit or pin on the bus expander bridge 80.

In step 730 of FIG. 4, the MIOC 100 determines if there is a proper communications connection between MIOC 100 and the bus expander bridge 80 or graphics expander bridge 88 of the new bus system. This can be done, for example, by executing the check connection protocol.

At step 740, if the bridge of the new bus system does not pass the check connection protocol (e.g., MIOC 100 determines that a proper communications connection does not exist between the bridge of the new bus system and MIOC 100), then the user disconnects the new bus system, step 750. Flow then proceeds back to step 710 where the user reconnects the same (or another) bus system into computer system 8 at step 710, and steps 720–740 are then repeated.

At step 740, if the bridge of the new bus system passes the check connection protocol, the flow of FIG. 4 proceeds to step 760. At step 760, the processor 10 then reads each bridge's configuration (CONFIG) register to determine what type of bridge in the new bus system is attached to the port (e.g., a bus expander bridge 80 or a graphics expander bridge 88). For example, in FIG. 1, processor 10 (under BIOS control) can read an ID Code in a bridge's CONFIG register to determine that bridge 80A is a bus expander bridge 80. Processor 10 also reads the bridge's CONFIG register to determine whether the expander buses 70 are configured in an independent mode or a combined mode (e.g., combining two expander buses 70 to create a single 32-bit bus). (Alternatively, this information describing the mode of expander buses 70 may be read from a CONFIG register in MIOC 100). Processor 10 also reads a mode flag (or mode register) in each bridge's CONFIG register to determine whether the PCI buses 90 have been configured in the independent mode or the combined mode, or some other mode.

In step 770, processor 10 identifies the one or more I/O devices connected to the I/O buses of the new bus system. This can be done, for example, by processor 10 reading an ID Code in a CONFIG register of each device.

In step 780, processor 10 configures the bridge (e.g., bus expander bridge 80 or graphics expander bridge 88) and the I/O devices by initializing several parameters in the bridge (80 or 88) and each I/O device, and by re-mapping the available memory mapped I/O address space to include the new bus system if necessary.

According to an embodiment of the present invention, a computer system is provided having one or more hot pluggable I/O buses (or bus systems). Each hot pluggable bus system includes a bridge (e.g., either a bus expander bridge 80 or graphics expander bridge 88), one or more I/O buses, 90 or 94 each having a plurality of expansion slots 92. In order to disconnect a bus system from the computer system 8 while power is applied to the computer system, the user notifies the computer system which bus system will be removed, the bus system is placed in a non-operational state, the I/O address space may be re-mapped, and an indication is then provided indicating that the bus system can be disconnected. To connect a bus system to the computer system while power is applied, the new bus system is connected. Power is applied, and the bus system is placed in an operational state, and the communications link between the bus system and computer system is verified. The type of the bridge in the bus system and the I/O device connected to the bus system are identified and configured.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer system comprising:

a host processor coupled to a host bus;

a memory system coupled to said host bus;

an I/O bridge controller coupled to the host bus and including a plurality of ports;

an I/O bus bridge that is hot plug connectable to at least one of said bridge controller ports via one or more first buses; and one or more second buses coupled to said bus bridge.

2. The computer system of claim 1 wherein said I/O bridge controller comprises a memory and I/O bridge controller.

3. The computer system of claim 1 wherein said host processor comprises a plurality of host processors coupled to the host bus.

4. The computer system of claim 1 wherein said I/O bus bridge comprises a bus expander bridge.

5. The computer system of claim 1 wherein said I/O bus bridge comprises a graphics expander bridge.

6. The computer system of claim 1 wherein said bus bridge comprises a plurality of I/O bus bridges, each I/O bus bridge being hot plug connectable to at least one of said bridge controller ports via one or more first buses.

7. The computer system of claim 6 wherein said plurality of I/O bus bridges comprises:
a first bus bridge being hot plug connectable to said I/O bridge controller via one of said first buses; and
a second bus bridge being hot plug connectable to said I/O bridge controller via two or more of said first buses;
said I/O bridge controller being configured to connect to said first bus bridge via one of said first buses and to connect to the second bus bridge via a combination of two of said first buses.

8. The computer system of claim 1 and further comprising one or more I/O devices, each of said I/O devices being coupled to one of said second buses.

9. The computer system of claim 1 wherein said second buses comprise PCI buses.

10. A computer system comprising:
a host processor coupled to a host bus;
an I/O bridge controller coupled to the host bus; and
a bus system that is hot plug connectable to said bridge controller, said bus system comprising:
an I/O bus bridge that is coupled to said bridge controller via one or more first buses; and
one or more second buses coupled to said bus bridge, each said second bus including one or more expansion slots for receiving an I/O device.

11. A method of unplugging a bus system from a computer system while power is applied to the computer system, comprising the steps of:
notifying the computer system which bus system will be unplugged;
placing the bus system in a non-operational mode;
re-mapping memory mapped I/O address space to account for removal of the bus system from the computer system;
providing an indication that the bus system may be unplugged from the computer system; and
unplugging the bus system while power is applied to the computer system.

12. The method of claim 11 wherein said step of notifying comprises actuating a switch on the computer system associated with the bus system.

13. The method of claim 11 wherein said step of re-mapping comprises the step of mapping the bus system out of the memory mapped I/O address space of the computer system.

14. The method of claim 11 wherein said step of placing the computer system in a non-operational mode comprises performing one or more of the following steps:
disabling one or more bus drivers of the computer system or the bus system;
quiescing bus activity between the bus system and the computer system; and
resetting at least a portion of the bus system.

15. The method of claim 11 wherein said step of providing an indication that the bus system may be unplugged comprises the step of providing a visual indication on the computer system to indicate that the bus system may now be unplugged from the computer system even though the computer is running.

16. The method of claim 11 wherein the bus system comprises a bus bridge and one or more I/O buses having expansion slots connected thereto.

17. A method of plugging in a bus system to a computer system while power is applied to the computer system, said bus system including a bus bridge and one or more I/O buses, said method comprising the steps of:
plugging in a bus system to the computer system while power is applied to the computer system;
applying power to the bus system;
placing the bus system in an operational mode;
confirming a communications connection between the computer system and the bus system;
performing the following steps only if the communications connection between the computer system and the bus system was successfully confirmed:
identifying the specific type of the bus bridge;
identifying a mode of operation of one or more of the I/O buses; and
configuring at least a portion of the bus system.

18. The method of claim 17 and further comprising the step of re-mapping the memory mapped I/O address space to account for the bus system that is being connected to the computer system.

19. The method of claim 17 wherein said computer system includes a host processor and an I/O controller, and further wherein said step of confirming a communications connection between the computer system and the bus system comprises the steps of:
issuing a check connection packet from the I/O controller to the bus system;
setting a flag indicating that a proper communications connection exists only if a response packet is received by the I/O controller from the bus system containing predetermined data.

20. A method of replacing a bus system in a computer system comprising the steps of:
notifying the computer system which bus system will be unplugged;
placing the bus system in a non-operational mode;
providing an indication that the bus system may be unplugged from the computer system; and
unplugging the bus system while power is applied to the computer system;
plugging in a replacement bus system to the computer system while power is applied to the computer system;
applying power to the replacement bus system;
placing the replacement bus system in an operational mode; and
confirming a communications connection between the computer system and the replacement bus system.

* * * * *